No. 703,657. Patented July 1, 1902.
J. HORN.
ATTACHMENT FOR PLUMBERS' PUMPS.
(Application filed Aug. 31, 1901.)
(No Model.) 2 Sheets—Sheet 1.
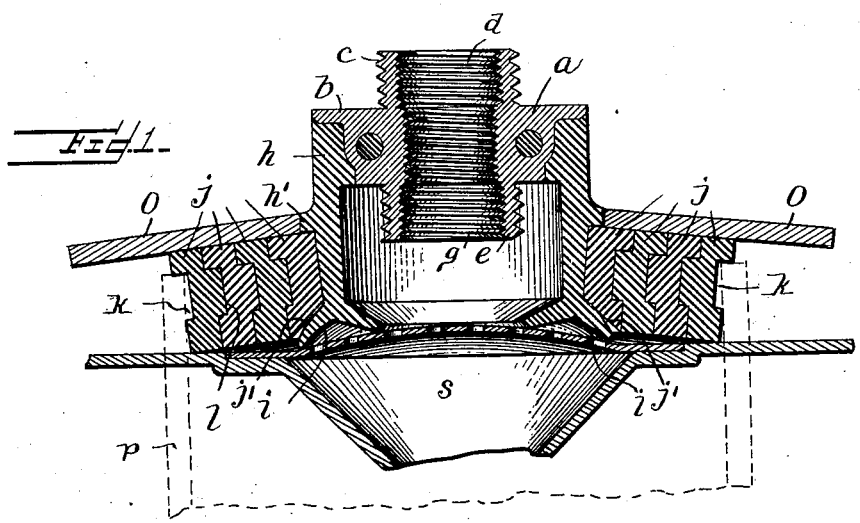
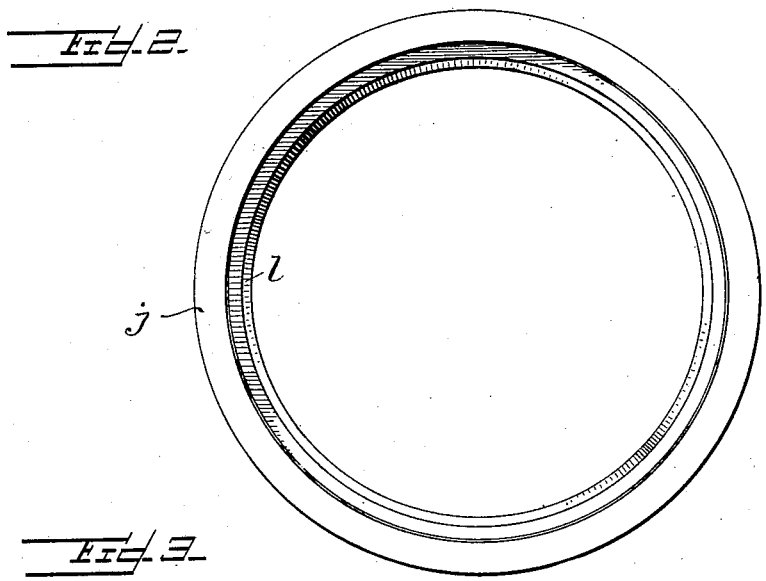
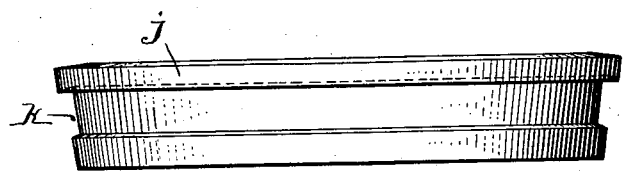
Witnesses: Inventor:
Joseph Horn
by Chas. A. Cutter.
Attorney.

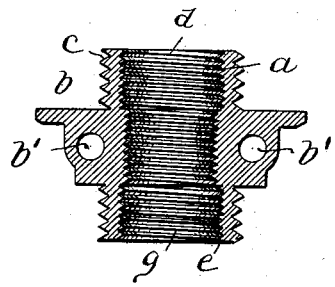
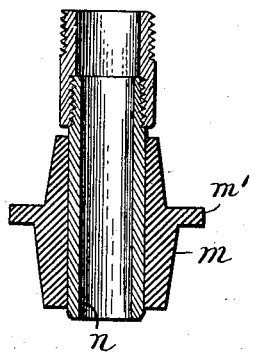
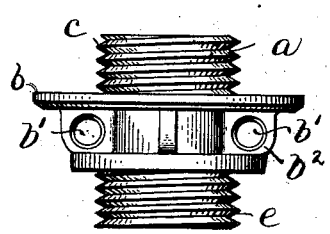
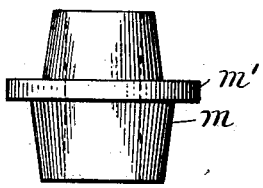
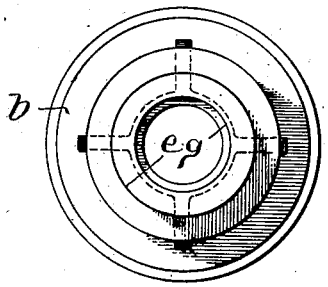
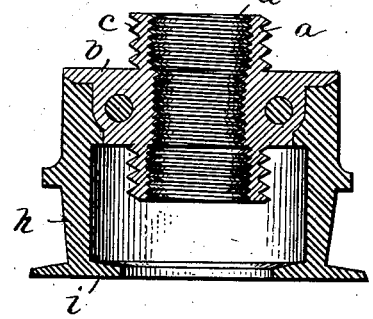

UNITED STATES PATENT OFFICE.

JOSEPH HORN, OF PHILADELPHIA, PENNSYLVANIA.

ATTACHMENT FOR PLUMBERS' PUMPS.

SPECIFICATION forming part of Letters Patent No. 703,657, dated July 1, 1902.

Application filed August 31, 1901. Serial No. 73,908. (No model.)

*To all whom it may concern:*

Be it known that I, JOSEPH HORN, a citizen of the United States, and a resident of the city and county of Philadelphia, State of Pennsylvania, have invented certain new and useful Improvements in Attachments for Plumbers' Pumps, of which the following is a specification.

My invention relates to improvements in means for making a tight joint between a plumber's pump and an orifice or a pipe; and the object of my invention is to furnish a connection which, with suitable attachments, can be used for making a tight joint between a pump and an orifice or a pipe of any pattern, section, or diameter.

In the accompanying drawings, forming part of this specification, and in which similar letters of reference indicate similar parts throughout the several views, Figure 1 is a central sectional elevation through a cup-shaped connection adapted for use in large pipes, sinks, water-closet bowls, &c., showing enlarging-rings in place; Figs. 2 and 3, a plan and side elevation of one of the enlarging-rings; Fig. 4, a central sectional elevation; Fig. 5, a side elevation; Fig. 6, a plan of holder for carrying the rubber cups or connections and the pipe or hose connected to pump; Fig. 7, a central sectional elevation of plug for closing pipes of small diameter and means for carrying said plug and for securing said plug-carrying means to the holder, Fig. 4; Fig. 8, a side elevation of reversible plug; Fig. 9, a central sectional elevation of the cup, Fig. 1 showing its position when pressed down on a flat surface.

*a* is the holder for the rubber cup and connected parts and forms the means for connecting the cup with the pump or with the pipe or hose which is connected to the pump. This holder is formed of metal—brass, preferably—and is furnished with a flange *b*, beneath which are wings $b^2$, furnished with perforations *b'*. The rubber cup *h* is cast upon the holder *a*, the rubber filling up the spaces between the wings and the perforations *b'* in the wings and being thereby held from any movement on the holder. The holder is furnished with an outside threaded upper end *c* for attachment to an ordinary hose-coupling, with a female thread *d* upon the inside of the upper end *c*, into which a threaded pipe or nipple (not shown) may be screwed, and preferably with an outside threaded lower end *e*, which is furnished upon the inside end with a female thread *g*.

*h* is the rubber cup, the lower end *i* of which is bifurcated, as shown in Figs. 1 and 9. The bifurcated end of the cup spreads out and forms a large and tight bearing when it is pressed down on a flat or uneven surface, as shown in Fig. 9, when operating upon the drainage-hole in a kitchen-sink, for instance.

When the apparatus is to be used to close an opening of larger diameter than that of the cup *h*, rubber lock-rings *j*, Figs. 1, 2, and 3, are placed upon the cup *h*, as shown in Fig. 1. If one ring does not sufficiently increase the diameter of the cup, a second ring is placed peripherally upon the first one, and so on until the desired diameter is reached. The rings *j* are constructed with an annular depression *k* upon their outer peripheries and with a corresponding annular projection *l* upon their inner peripheries, the projection upon one ring being adapted to rest in the depression in the next one to form a lock, which securely holds the rings together.

The inner periphery of the inner ring, that which is carried by the cup *h*, is preferably straight, its under part *j'* being beveled outwardly, so as to correspond approximately with the shape of the top of the outside bifurcated end of the cup *h*. The cup *h* is furnished with a shoulder *h'*, which engages and holds the top of the inner ring *j*.

If it be desired to close a pipe of smaller diameter than can be conveniently closed by cup *h*, I make use of the plug *m*, Figs. 7 and 8. This plug is hollow and is adapted to be carried by a pipe or nipple *n*, which can be screwed into or upon the lower end *e* of the holder *a*. The plugs *m* may be made of any desired diameter and should taper toward their lower ends. For convenience and to reduce the number of plugs necessary for a plumber's outfit I make two plugs in one—that is, I make the plug tapering from the middle toward both ends and each end of a different diameter, as shown. Either end of the plug may be used for closing the end of a pipe.

*m'* is a flange carried at the bases of the two plugs, the purpose of which is to close the end of a pipe that might be of such a size that it could not be tightly closed by either of the plugs themselves.

In Fig. 1 a flat washer $o$, covering the tops of rings $j$, is shown. This washer is used to assist in keeping the rings in place when the device is used in closing a pipe when a very heavy pressure of air or water is used for the purpose of starting and obstruction. In Fig. 1, $p$ (shown in dotted lines) represents a pipe the end of which is closed by the cup and rings, and $s$, in full lines, a sink-opening closed by the same construction.

The rubber cup $h$ and rings $j$ being perfectly flexible can be caused to close an opening of almost any section. They can be used either at the end or mouth of a pipe or can be forced down the pipe, so as to close this latter off at some distance below its mouth. The flexible construction of the cups and rings are particularly adapted for use in water-closet bowls, large perforated sinks, &c.

Having thus described my invention, I claim as new and desire to secure by Letters Patent—

1. In combination, a metallic holder furnished with a flange and perforated wings and with a central passage threaded to receive a pipe or coupling and a flexible rubber cup adapted to be cast upon said holder, the lower end of said cup being bifurcated.

2. In combination, a metallic holder furnished with a central passage threaded to receive a pipe or coupling, a flexible rubber cup adapted to be held by said holder, and detachable rubber rings concentric with said cup, adapted to be carried upon the outer side thereof to increase its diameter.

3. In combination, a metallic holder furnished with a threaded central passage adapted to receive a pipe or coupling at either end and with a flange and perforated wing, a flexible rubber cup, the upper end of which is cast upon said holder and the lower end of which is bifurcated and which is furnished upon its outside with a ring or shoulder $h'$, detachable concentric rubber rings carried by said cup, means for locking said rings one to the other, and a detachable flat washer adapted to bear upon the tops of said rings.

JOSEPH HORN.

Witnesses:
GEORGE W. SELTZER,
CHARLES A. RUTTER.